Patented Aug. 1, 1939

2,167,661

UNITED STATES PATENT OFFICE 2,167,661

NITROGEN-HALOGEN ORGANIC BODIES AND PROCESS OF MAKING SAME

Leon Lilienfeld, Vienna, Austria; Paul Abel, Vienna, Austria (Germany), or in the case of his inability to act, Emerich Hunna, Vienna, Austria (Germany), executors, and Antonette Lilienfeld, Vienna, Austria (Germany), sole heir of Leon Lilienfeld, deceased No Drawing. Application April 1, 1937, Serial No. 134,426. In Great Britain July 4, 1931

29 Claims. (Cl. 260—584)

The present invention relates to certain novel compounds which contain (in one or more aliphatic chains) organically combined halogen (preferably chlorine), organically combined nitrogen (preferably in the form of —NH$_2$ groups and/or =NH groups) and organically combined oxygen (preferably in the form of —OH groups). In stating that these substituents are organically combined, I mean that these substituent elements are linked directly to carbon atoms in said aliphatic chains. The products also usually contain unsaturated groups, as can be proven by the fact that they are capable of adding iodine by direct addition, to produce saturated bodies. The products furthermore are water-soluble and are (in most cases) also alcohol-soluble. The invention also embraces methods of production of said products by reacting ammonia upon an unsubstituted dihalogenhydrin, preferably a dichlorohydrin of glycerol.

The products of the present process are very suitable for reacting with viscose, by methods as disclosed in my application Ser. No. 618,801 co-pending with the parent application Ser. No. 618,800, filed June 22, 1932, (of which the present case is for the most part a continuation) and which Case 618,801 has now matured into U. S. Patent 2,051,051. The products of the present process are also suitable for reacting with alkali cellulose by methods as disclosed in another co-pending Case 618,802, which has now matured into U. S. Patent 2,100,010.

The products of the present case are very suitable for reacting with alkali cellulose (as described in the last mentioned application) for introducing an organic radical into the cellulose molecule, which radical contains an amino group or an imino group. Hence it is essential that the products contain the nitrogen and the halogen both organically combined, and the nitrogen and halogen are attached to different carbon atoms. The solubility in water is also essential, since obviously it is possible to control the reactions, and to effect reaction fully with insoluble alkali cellulose, only if soluble materials are employed.

But it will be understood that the products of the present case can be used for various other purposes, besides application in the above mentioned cases.

I am already aware that certain reactions of ammonia upon dichlorohydrins have been investigated to some extent by Berthelot and Luca (see Annales de Chimie et de Physique [3], vol. 48, page 317 et seq.) and by Claus (see Annalen der Chemie und Pharmacie, vol. 168, page 29 et seq), but the reactions investigated by these prior workers were such as were conducted at high temperatures and/or without temperature control, and such of their products as are correctly described in said articles, as containing organically combined nitrogen and organically combined halogen, were insoluble in water, alcohol and all other named liquids. In certain other cases these prior workers show the production of soluble hydrochlorides or hydrobromides of nitrogen containing bases, but such products of course do not contain organically combined halogen and are accordingly not useful for such reactions contemplated in my said cases above mentioned. In the processes so far as described in said two articles, products which contain organically combined halogen and organically combined nitrogen, and which also are soluble in water (or in alcohol, or other known solvents), were not produced. And so far as I am informed, such products have not been produced by other known processes and are wholly new.

Accordingly the processes as described herein, and the products of said processes, or said products irrespective of any particular mode of producing same, are included in the scope of the present invention. Thus I claim these novel products no matter how made, whether made from dihalogenhydrins or not.

In carrying out the process of the present invention it is essential to prevent the temperature of the reaction from rising to 100° C. or above, and it is essential to prevent the continuance, for any long periods of temperatures at which insoluble organic products would be formed in any considerable or substantial amount. But if the temperature goes up, due to the strongly exothermic nature of the reaction (or from other causes) even to near 100° C. (say 90 or 95° C.) momentarily, and the temperature is then quickly reduced, useful products can still be obtained, provided the high temperature is not continued for long enough time to form insoluble products in substantial amounts.

The reactions may be conducted in the presence of one or more solvents or diluents, such as alcohol, water and the like.

The above statement as to keeping the temperature below 100° C. applies not only to the duration of the reaction, but also to the isolation and/or purification (if any) of the organic products of the reaction, and in the isolation and/or purification, temperatures above 80° C. are preferably avoided.

The products of the present invention contain "organically combined" nitrogen and halogen (i. e., nitrogen and halogen both linked, i. e. directly bonded, to carbon) and also contain oxygen in the form of a substituted or unsubstituted hydroxyl group also linked to carbon. These products are soluble in water, and usually also soluble in alcohol. This is particularly the case when the times of reaction are kept within reasonable limits (for example 10 to 40 days when continuously at room temperature or 3 to 6 hours when the temperature goes up to 50° C.).

These products are aliphatic organic substances, soluble in water and usually also in alcohol but insoluble in ether. Said products may be described as compounds which contain, in a polyvalent aliphatic nucleus, (a) at least one nitrogen atom (preferably in an amino group) attached to a carbon atom of said nucleus, (b) at least one halogen atom (chlorine in the examples) attached to a carbon atom of said nucleus, and also (c) at least one oxygen atom (preferably in an unsubstituted hydroxyl group) attached to a carbon atom of said nucleus, and if these three substituents are each contained only once in the molecule, not more than two of them are attached to one and the same carbon atom, and if one or two or all three of these different substituents are contained more than once in the molecule, there is among them at least one nitrogen atom and at least one oxygen atom, and at least one halogen atom, of which not more than two of said different kinds of atoms are attached to the same carbon atom, while the third is attached to some other carbon atom. The products which contain the elements nitrogen, oxygen and halogen all attached (or linked or bonded) to three different carbon atoms, are the preferred products.

The products of the invention are valuable reagents for various synthetical reactions in addition to those above stated, and are also intended for medicinal and/or cosmetic purposes.

I shall now give several examples of my invention, but it will be understood that the invention is not limited to these details.

The parts are by weight.

EXAMPLE 1

1185 parts of a solution of ammonia in absolute alcohol (produced by the introduction of 240 parts of dry ammonia gas into 1000 parts of cold absolute alcohol, e. g., at 0° C.) are added to 1000 parts of cold alpha-dichlorohydrin and the mixture is kept, with intermittent shaking, in a well closed vessel at 16 to 18° C. for 10 days. After that time, the clear alcoholic mother liquor is separated from the crystals of ammonium chloride by filtration, the ammonium chloride crystals are washed with absolute alcohol and the clear alcoholic filtrate, together with the washing alcohol, is freed from alcohol and ammonia by distillation under reduced pressure at 30 to 35° C.

The residue is a clear, yellow, very viscous oil, soluble in water, alcohol, aqueous pyridine and acetone, but insoluble in ether and in carbon tetrachloride.

If desired, the product of the reaction may be purified by one of the following methods:

First method

The crude product of the reaction, that is the residue remaining after the distillation of the alcohol and ammonia, is freed from the alpha-dichlorohydrin (if any) by distilling off the dichlorohydrin under reduced pressure (15 to 18 mm. absolute) at 70 to 80° C.

The product being rather sensitive to the action of heat, the temperature of 70 to 80° C. should not be exceeded.

The residue of the distillation is a perfectly clear, yellow, very thick syrup, the consistence of which is similar to that of a very thick honey or Venice turpentine.

Second method

The crude reaction mass, that is, the residue left after the distillation of the alcohol and ammonia from the crude reaction product, is kneaded with repeatedly changed quantities of ether until, on evaporation, the ether (after such use) does not leave any residue, whereupon the product is dried (ether removed by distillation or evaporation) at reduced pressure at room temperature.

The final product is an almost clear yellow syrup, having the consistency of a very thick honey or Venice turpentine.

Third method

The reaction mixture, without being freed from the alcohol and ammonia, is allowed drop by drop to enter into a quantity of ether sufficient to cover the mass, under continuous stirring. The milky precipitate collects in the form of a doughy mass, partly on the surface of the walls and partly on the bottom of the vessel in which the precipitation is effected. After being freed from the almost clear mother liquor by decantation of the latter, the precipitate is collected and kneaded with fresh portions of ether until, on evaporation, the ether does not leave any residue, whereupon the residue is dried under reduced pressure at room temperature. The final product is a yellow mass having a consistency similar to that of Venice turpentine.

The final product (purified by any of the above three methods) is readily soluble in water, aqueous ethyl alcohol and methyl alcohol and is dried in vacuo at room temperature.

The products (before and after purification) contain unsaturated constituents.

Analysis of the purified product:

|  | Per cent |
|---|---|
| N | 7.25 to 8.7 |
| Cl | 32.3 to 38.4 |

EXAMPLE 2

The process is conducted as in Example 1, but with the difference that, instead of 1185 parts of the alcoholic ammonia solution, 1702 parts of the alcoholic ammonia solution are used.

Analysis of the purified product:

|  | Per cent |
|---|---|
| N | 8.6 to 9.7 |
| Cl | 34.2 to 38.3 |

EXAMPLE 3

The process is conducted as in Example 1, but with the difference that, instead of 1185 parts of the alcoholic ammonia solution, 2040 parts of the alcoholic ammonia solution are used.

Analysis of the purified product:

|  | Per cent |
|---|---|
| N | 4.71 |
| Cl | 28.7 |

EXAMPLE 4

The process is conducted as in Example 1, but with the difference that, instead of 1185 parts of the alcoholic ammonia solution, 2720 parts of the alcoholic ammonia solution are used.

Analysis of the purified product:

|    | Per cent |
|----|----------|
| N  | 4.18     |
| Cl | 32.2     |

EXAMPLE 5

The process is conducted as in Example 1, but with the difference that, instead of 1185 parts of the alcoholic ammonia solution, 170 parts of the alcoholic ammonia solution are used.

Analysis of the purified product:

|    | Per cent |
|----|----------|
| N  | 4.03     |
| Cl | 40.8     |

EXAMPLE 6

The process is conducted as in Example 1, but with the difference that, instead of 1185 parts of the alcoholic ammonia solution, 340 parts of the alcoholic ammonia solution are used.

Analysis of the purified product:

|    | Per cent |
|----|----------|
| N  | 5.97     |
| Cl | 39.1     |

The elementary composition of the products of Examples 1, 2 and 6 corresponds fairly with the formula $C_6H_{13}O_2NCl_2$.

As a matter of course, it is not desired to limit this invention to any chemical formulae or definitions, since, while the products are probably compounds or derivatives of the type mentioned, the final composition of the products is not definitely known.

EXAMPLE 7

The process is conducted as in Example 1, but with the difference that, instead of 1185 parts of the alcoholic ammonia solution, 680 parts of the alcoholic ammonia solution are used.

Analysis of the purified product:

|    | Per cent    |
|----|-------------|
| N  | 5.4 to 5.9  |
| Cl | 26.6 to 38.4|

EXAMPLE 8

The process is conducted as in any one of the foregoing examples, but with the difference that, instead of 10 days, the time of the reaction is 20 to 40 days.

The foregoing examples may also be carried out by dissolving the alpha-dichlorohydrin in the relative amount of alcohol and the relative amount of ammonia introduced into the alcoholic dichlorohydrin solution in the form of dry gaseous ammonia, preferably under cooling. During this process the temperature is kept below 100° C. and preferably at or below normal room temperature.

EXAMPLE 9

The process is conducted as in Example 1, but with the difference that the reaction is carried out by bringing the materials together at 60 or 65° C. and allowing the reaction to continue while maintaining the temperature between 60 and 75° C. or by applying at the outset any temperature below 60 or 75° C. and taking care that during the reaction the temperature rises to 75° C. but that the temperature does not rise above 75° C. in an autoclave, the time of the reaction being 3 hours.

The final product has the same appearance and properties as the product obtained in Example 1.

EXAMPLE 10

The process is conducted as in Example 1, but with the difference that the reaction occurs at 50° C. in an autoclave, the time of the reaction being 3 hours.

The final product has the same appearance and properties as the product obtained in Example 1.

EXAMPLE 11

The process is conducted as in Example 2, but with the difference that the reaction occurs at 50° C. in an autoclave, the time of the reaction being 3 hours.

The final product has the same appearance and properties as the product obtained in Example 2.

The technical advance of the present process clearly follows from the fact that, when (contrary to the present invention) any one of the preceding examples is executed at 100 to 105° C., a solid amorphous product results which is insoluble or only scarcely soluble in water or in alcohol or the like, and therefore useless. Accordingly, I do not react at temperatures of 100 to 105° C., and preferably the temperature, during the entire reaction, is not allowed to rise above room temperature.

When the final products of the present invention (i. e., after isolation and purification) are heated to 100° C., they are converted into solid resin-like materials still soluble in water.

Instead of using an alcoholic or aqueous solution of ammonia, dry gaseous ammonia can be introduced directly into alpha-dichlorohydrin without dilution, cooled externally by means of a refrigerant, for which purpose ice water may sometimes be used. The reacting materials are kept at below 25° C., throughout the process. After the completion of the reaction and after freeing the product from the crystals of NH₄Cl by filtration, the filtrate is to be regarded as comprising the crude product of the reaction which, if desired, may be purified, for example according to any one of the methods described in connection with Example 1.

When the present process is carried out according to this modification, the gaseous ammonia may be introduced into an unsubstituted dihalogenhydrin either in such a manner that the contemplated amount of ammonia is introduced in one portion and operation or in several portions or operations. These two alternatives are illustrated in the following two examples.

EXAMPLE 12

1000 parts of alpha-dichlorohydrin are cooled down to minus 10° C., whereupon dry gaseous ammonia is introduced until the reaction mass weighs 1230 parts. The reaction mass is now allowed to stand at 16° C. for 3 to 5 days. Throughout this time, i. e., from the commencement of the process, the temperature in the reacting mixture should not go above 25° C., and preferably not above 16° C. During this time there is formed a considerable amount of white crystals of ammonium chloride.

After the said 3 to 5 days, the product of the reaction is freed from the ammonium chloride by filtration and then kept under reduced pressure at room temperature (e. g., for several hours) in order to remove the last traces of ammonia.

The final product is a viscous, clear oil that is soluble in water and alcohol. On standing at room temperature for a longer time, e. g., 2 to 3 days, it has a tendency to become turbid or even of depositing crystals which are probably ammonium chloride.

It may be purified, for instance according to any one of the methods described in Example 1.

I am aware that in the Berthelot and Luca article mentioned above, a process was vaguely described in which ammonia gas was introduced into dibromhydrin, but seemingly no attempt was made to control the temperature. It was stated in said article that the mass became hot, which is natural, since the reactions are strongly exothermic. There was said to be produced hemibrom-hydr-amide, a material which was free from organically combined halogen and, as there stated, insoluble in water, alcohol, ether and glacial acetic acid.

In a modification of that process as described vaguely in said article, ammonia gas was led into an alcoholic solution of dibromhydrin in absolute alcohol. No temperatures are given, nor was there any control of the temperature. Here, according to said article, a hydrobromide of glyceramine was stated to be formed. Such a body contains no organically combined halogen, and would be of no interest in the present invention. The fact that the hydrobromide of glyceramine was formed, is itself a clear indication that the temperature was allowed to go too high and/or was allowed to remain high for too long a time, during the process.

EXAMPLE 13

1000 parts of alpha-dichlorohydrin are cooled down to 0° C., whereupon dry gaseous ammonia is introduced until the reaction mass weighs 1080 to 1085 parts. 3 to 4 hours may be consumed in such introduction of ammonia gas. During this introduction the temperature may safely rise to 5° C., but should not exceed 10° C.

The reaction mass is allowed to stand at room temperature for about 20 to 24 hours during which time one of the taps with which the vessel is fitted, remains open.

After that time, the reaction mass is again cooled down to 0° C. and gaseous ammonia introduced until the reaction mass weighs 1170 to 1180 parts, whereupon the vessel is allowed to stand in the refrigerator (at about 0° C.) over night with one of the taps open. During this time, the amount of the separated crystals of ammonium chloride shows a distinct increase. Since part of the introduced ammonia escapes during standing on ice, after that time, the total weight of the reaction mass is 1140 to 1145 parts.

This procedure (introduction of ammonia and allowing to stand for 12 hours or more) is further repeated another four times, the weights of the reaction mass being as follows:

*Third day:* Weight of the mass immediately after the introduction of the gaseous ammonia: 1180 to 1190 parts.

Weight of the reaction mass after standing over night on ice: 1150 to 1160 parts.

*Fourth day:* Weight of the reaction mass immediately after the introduction of the gaseous ammonia: 1190 to 1195 parts.

Weight of the reaction mass after standing over night on ice: 1190 to 1195 parts (no decrease).

*Fifth day:* Weight of the reaction mass immediately after the introduction of the gaseous ammonia: 1195 to 1200 parts.

Weight of the reaction mass after standing over night on ice: 1190 to 1195 parts (slight decrease).

*Sixth day:* Weight of the reaction mass immediately after the introduction of the gaseous ammonia: 1210 to 1220 parts.

After the first day the reaction proceeds at a slow speed and no considerable rise of temperature occurs.

Now the reaction mass is freed from the excess of ammonia by blowing through a current of air for 4 hours, the final weight being 1175 to 1180 parts.

During the entire period of the reaction, the temperature of the reaction mass did not exceed about 25° C. Hence, the reaction mass is soluble in water, and (except the ammonium chloride) is soluble in alcohol. In carrying out the process, in accordance with this example, the temperature in the reaction mass should be kept below about 20° C., otherwise considerable portions (or all) of the organic material will be converted into products insoluble in water.

Now the product of the reaction is freed from the crystals by filtration and then kept (for several hours or several days) under reduced pressure at room temperature in order to remove the last traces of ammonia.

The final product is a viscous, clear oil that is soluble in water and alcohol. In standing at room temperature for a longer time, it has a tendency to become turbid or even of depositing crystals which are probably ammonium chloride.

It may be purified, for instance, according to any one of the methods described in Example 1.

EXAMPLE 14

The process is conducted as in Example 1, but with the difference that, instead of 1185 parts of the strong alcoholic ammonia solution, 7400 parts of a 4 per cent. solution of ammonia ($NH_3$) in absolute alcohol, are used.

The properties of the product of this example are similar to the properties of the product of Example 1 or 2.

In their paper commented upon above, Berthelot and Luca describe two products of their experiments in which dibromohydrin was treated with ammonia.

In the first experiment they introduce a current of gaseous ammonia into the dibromohydrin without any external or internal cooling. Owing to the lack of cooling great heat evolves for two different reasons: a physical reason and a chemical reason.

The physical part of the process consists in the dissolution of the gaseous ammonia in the halohydrin which is attended by the liberation of a very great amount of heat.

The chemical reaction between ammonia and dibromohydrin is of exothermic nature, the enormous exothermic heat produced being caused by the elimination of the halogen atom through the action of the strong alkali (gaseous ammonia) on the halohydrin attended by the substitution of the eliminated halogen atom by the amino group on the one hand and the formation of ammonium chloride as by-product on the other.

The physical and chemical changes which take place in Berthelot's first experiment give vent to an evolution of a huge quantity of heat and in Berthelot's experiments no steps whatever are taken towards the elimination or even mitigation of the evolution of heat. Consequently, both creators of heat—the physical and the chemical creator co-operate towards a tremendous rise of the temperature of the reaction mass.

Curious to relate, Berthelot and Luca do not state the temperature attained in their experiment. But there is another very characteristic symptom which proves beyond a doubt that the rise of temperature in Berthelot's experiment must have been enormous—the discoloration of the reaction mixture and of the final product.

This discoloration is an infallible sign that the maximum of the temperature of the reaction must have been very high and, at any rate, far above 100° C., since otherwise a discoloration of the reaction mixture would have never occurred. For, the numerous experiments that were carried out in my laboratory at 100° C. and 120° C. and 128° C. having undubitably shown that at 100 or 120 or 128° C. no discoloration whatever takes place.

The high temperature of the reaction and the large excess of the gaseous ammonia in Berthelot's experiment results automatically in a very fast and vehement reaction which makes itself manifest by the quick and considerable separation of the ammonium bromide. It has been ascertained in my laboratory that the reaction does not stop until all halogen is withdrawn from the halohydrin and converted into ammonium halide. This follows also from the well known mobility of the halogen atoms in the halohydrins, i. e., from their great tendency towards leaving the halohydrin molecule under the action of strong alkalies.

The best proof of the fact that in Berthelot's and Luca's experiment great evolution of heat took place is the circumstance that their product is perfectly insoluble in water and alcohol, which fact is not only expressly stated in their paper, but also fully corroborated by the fact that they purified their substance by washing it with water, alcohol and ether.

In their second experiment in which they used alcohol as diluent, Berthelot and Luca obtained the bromohydrate of a new base which did not contain any organically bound halogen and which also in the form of the free base was perfectly free from halogen.

The formation of a base which is free from halogen is not only a sign of the presence of a very large excess of ammonia in the reaction mass, but also of a great evolution of heat. For, as my experiments have shown, glyceramine is only obtainable by acting with a very large excess of gaseous ammonia on a solution of dihalohydrin in alcohol at temperatures by far exceeding 100° C. However, the feature which puts Berthelot's glyceramine outside the boundaries of the present invention, and which therefore shows that also the second experiment of Berthelot and Luca has nothing whatever to do with the present invention is and remains the fact that their product is free from organically combined halogen and therefore incapable of undergoing any metathetical reactions.

In the foregoing examples, instead of the alpha-dichlorohydrin, beta-dichlorohydrin may be used.

In the foregoing examples, where desired or expedient, instead of the dichlorohydrin, the equivalent quantities of dibromhydrin may be used (either alpha or beta).

Most of the products produced in the present process from dihalogenhydrins of glycerol, when decomposed by being heated (for example at 140° C.) with strong hydriodic acid (for instance, of 1.7 sp. g.) yield $C_3H_7I$ (propyl iodide or isopropyl iodide).

The products produced in the examples of the present application from dihalogenhydrin of glycerol are also unsaturated compounds or at least contain unsaturated constituents and are therefore capable of adding iodine. According to my researches, it is even possible that the products of the present invention, when properly purified, contain a very large amount of unsaturated compounds, which fact is shown not only by the amount of iodine which the compounds are capable of adding, but also from the fact that such products of the invention, when heated with hydriodic acid, yield only small quantities of $C_3H_7I$ or no $C_3H_7I$ at all.

In the foregoing examples in which absolute alcohol is used as diluent, also aqueous alcohol, for example alcohol of 80 to 90 per cent. strength can be used instead of absolute alcohol. The more water the alcohol contains the more ammonium chloride is kept in solution. When however, the alcohol is removed by evaporation, also the water evaporates off and the ammonium chloride separates out.

I claim:

1. A process of manufacture of water-soluble organic compounds containing nitrogen linked to carbon and halogen linked to carbon and oxygen linked to carbon, by causing ammonia to act on an unsubstituted dihalogenhydrin of glycerol, and maintaining the reaction mass at temperatures below 100° C., during the entire period of the reaction and also during any subsequent isolation and purification of the desired product, and avoiding high temperatures in the reaction mass for such periods as would lead to the formation of substantial amounts of insoluble organic bodies or of bodies not containing organically combined halogen.

2. A process of preparing water-soluble glycerine derivatives containing nitrogen attached to carbon and halogen attached to carbon, and oxygen attached to carbon, which comprises reacting glycerine dihalohydrin with ammonia at temperatures maintained below 100° C., for a period sufficient to form a glycerine derivative containing nitrogen attached to carbon, and halogen attached to carbon, and oxygen attached to carbon, but insufficient to form water-insoluble products, and insufficient to form products not containing halogen attached to carbon.

3. A process for the manufacture of water-soluble aliphatic organic compounds containing organically combined nitrogen and halogen and hydroxyl, by causing ammonia in an alcoholic solution to act upon an unsubstituted dihalogenhydrin of glycerol, wherein during the entire time of the reaction producing the product containing halogen linked to carbon, nitrogen linked to carbon and hydroxyl linked to carbon, the temperature is kept too low to cause the formation of substantial amounts of water-insoluble halogen, and nitrogen-containing organic bodies or of organic bodies that do not contain both halogen linked to carbon and nitrogen linked to carbon.

4. A process for the manufacture of water-soluble aliphatic organic compounds containing organically combined nitrogen and halogen and hydroxyl, by causing ammonia in an alcoholic solution to act upon an unsubstituted dihalogenhydrin of glycerol, wherein during the entire time of the reaction, and during the subsequent isolation and purification of the product containing halogen linked to carbon, nitrogen linked to carbon and hydroxyl linked to carbon, the temperature is kept so low as to preclude the formation of substantial amounts of water-insoluble halogenand nitrogen-containing organic bodies or of organic bodies that do not contain both halogen linked to carbon and nitrogen linked to carbon.

5. A process for the manufacture of organic compounds containing organically combined halogen and organically combined nitrogen and organically combined hydroxyl by causing ammonia to act on an unsubstituted dihalogenhydrin of glycerol in the presence of a diluent selected from the herein described group consisting of alcohol and water, wherein during all phases of the reaction, a temperature below 100° C. is maintained, and avoiding such continued high temperatures in the reaction mass, during the process, as would form substantial amounts of water-insoluble organic bodies or of bodies not containing organically combined halogen.

6. A process for the manufacture of organic compounds containing organically combined halogen and organically combined nitrogen and organically combined hydroxyl by causing ammonia to act on an unsubstituted dihalogenhydrin of glycerol in the presence of a diluent selected from the group consisting of alcohol and water, wherein during all phases of the reaction, and during the isolation and purification of the product, the temperature is maintained below 100° C., and avoiding such continued high temperatures in the reaction mass, during the process, as would form substantial amounts of water-insoluble organic bodies or of bodies not containing organically combined halogen.

7. A process as in claim 1, in which the ammonia is introduced into the dihalogenhydrin in gaseous form.

8. A process as claimed in claim 1, wherein the dihalogenhydrin is a glycerol dichlorohydrin.

9. A process as claimed in claim 1, wherein the dihalogenhydrin is alpha-dichlorohydrin of glycerol.

10. A process of producing water-soluble organic reaction products of ammonia and a dihalogenhydrin which comprises subjecting a dihalogenhydrin of glycerol to treatment with ammonia gas, allowing the materials to react while maintained at not substantially above ordinary room temperature, and thereafter purifying the liquid viscous organic reaction product by removing the excess of ammonia and unreacted dihalogenhydrin, and throughout all phases of the said process, maintaining the reaction mass at a temperature too low to produce substantial amounts of water-insoluble halogen- and nitrogen-containing organic bodies or substantial quantities of products which do not contain halogen linked to carbon.

11. A process of producing water-soluble organic reaction products of ammonia and a dihalogenhydrin which comprises subjecting a dihalogenhydrin of glycerol to treatment with ammonia gas, allowing the materials to react while maintained at substantially below ordinary room temperature, and thereafter purifying the liquid viscous organic reaction product, and throughout all phases of the said process, maintaining the reaction mass at temperatures too low to produce substantial amounts of water-insoluble halogen- and nitrogen-containing organic bodies or substantial quantities of products which do not contain halogen linked to carbon.

12. In the treatment of a dihalogenhydrin of glycerol with ammonia, the herein described process which comprises mixing the dihalogenhydrin with the ammonia in the presence of an inert diluent liquid, and maintaining the mixture at temperatures not substantially above 75° C., for at least several hours, and agitating the mixture during said period, and preventing such rise of temperature and continuance of high temperature in the mass as would cause the formation of water-insoluble organic substances or substances free from organically combined halogen.

13. A method of forming organic bodies containing organically combined halogen and organically combined nitrogen and organically combined hydroxyl, which comprises reacting upon a dihalogenhydrin of glycerol with ammonia, at a temperature not above 50° C., and allowing reaction to continue at not above 50° C., until solid ammonium halide is produced in the reaction mass, and only until a liquid viscous organic reaction product is formed which is soluble in water, and which contains halogen linked to carbon and nitrogen linked to carbon and oxygen linked to carbon.

14. In the process of making water-soluble organic compounds containing organically combined halogen and organically combined nitrogen and organically combined hydroxyl by allowing ammonia to act upon a dihalogenhydrin of glycerol, and continuing the treatment for at least several hours, the herein described improvement which comprises maintaining the reaction mass, during substantially the whole of said treatment, at a temperature below 100° C., and avoiding in the reaction mass, sustained high temperatures sufficiently to lead to the production of substantial amounts of water-insoluble organic bodies or bodies not containing organically combined halogen, and purifying the water-soluble organic reaction products containing organically combined halogen and organically combined nitrogen, by distilling excess ammonia and unreacted dihalogenhydrin therefrom, in vacuum, while at temperatures not substantially above 80° C., without destroying the water-solubility thereof.

15. A process of producing soluble organic compounds which contain in an aliphatic group organically combined halogen, organically combined nitrogen and organically combined hydroxyl, which comprises reacting with ammonia upon a dihalogenhydrin of glycerol, while maintaining the reaction mixture at not substantially above room temperature throughout the entire period of the reaction and throughout the subsequent isolation and purification also.

16. A method of forming water-soluble organic bodies containing organically combined nitrogen and organically combined chlorine and organically combined hydroxyl which comprises reacting upon alpha-dichlorohydrin of glycerol with ammonia, and maintaining the reaction mass at not substantially above normal room temperature throughout the reaction period.

17. A method of forming water-soluble organic bodies containing organically combined nitrogen and organically combined chlorine and organically combined hydroxyl which comprises reacting upon alpha-dichlorohydrin of glycerol with ammonia, and maintaining the reaction mass at not substantially above normal room temperature throughout the reaction period and throughout the subsequent isolation and purification of the organic reaction product.

18. A method of forming water-soluble organic bodies containing organically combined nitrogen and organically combined chlorine and organically combined hydroxyl which comprises reacting upon a dihalogenhydrin of glycerol with ammonia, and maintaining the reaction mass at not substantially above normal room temperature, throughout the reaction period and throughout any isolation and purification of the product of the reaction.

19. A water-soluble organic body containing organically combined nitrogen and organically combined halogen and organically combined hydroxyl, such body being substantially identical with the product produced by the process as set forth in claim 18.

20. Water-soluble organic substances of viscous-oily to resinous consistency, containing in an aliphatic chain, halogen, nitrogen and oxygen, all attached to carbon atoms of said aliphatic chain, of which substituents not more than two are attached to the same carbon atom, and which substances are reaction products of ammonia on a dihalogenhydrin of glycerol.

21. The herein described product consisting of the liquid viscous reaction product of ammonia upon a dihalogenhydrin of glycerol, which product is soluble in water, said product containing halogen linked to carbon in an aliphatic chain and containing nitrogen linked to carbon in said chain and containing hydroxyl linked to carbon in said chain, and of which three constituents, not more than two are linked to the same carbon atom in said aliphatic chain.

22. As new products, aliphatic compounds which are water-soluble, of viscous-oily to resinous consistency, which contain nitrogen, halogen and at least one hydroxyl group all organically combined and each linked to carbon, in the same aliphatic chain, and which, on being decomposed with hydriodic acid, yield $C_3H_7I$, and which products can be produced by reacting upon a dihalogenhydrin of glycerol with ammonia, while maintaining the temperature of the reacting mixture too low to form water-insoluble organic bodies or organic bodies not containing halogen linked to carbon.

23. As new products, aliphatic organic compounds which are water-soluble, of viscous-oily to resinous consistency, and which contain unsaturated constituents and which contain organically combined halogen and nitrogen and hydroxyl, and which products can be produced by reacting upon a dihalogenhydrin of glycerol with ammonia, while maintaining the temperature of the reacting mixture too low to form water-insoluble organic bodies or organic bodies not containing halogen linked to carbon.

24. As new products, organic compounds which are water-soluble, of viscous-oily to resinous consistency, and which contain unsaturated constituents, and which contain organically combined halogen, nitrogen and hydroxyl, each of said substituents being linked to a carbon atom in an aliphatic chain, and which products can be produced by reacting upon a dihalogenhydrin of glycerol with ammonia, while maintaining the temperature of the reacting mixture too low to form water-insoluble organic bodies or organic bodies not containing halogen linked to carbon.

25. As new products, aliphatic compounds which are viscous-oily to resin-like bodies, soluble in water and which are unsaturated substances, containing hydrogen, carbon, nitrogen, halogen and at least one hydroxyl group, said nitrogen, halogen and hydroxyl group each being linked to carbon in said compound, and which products can be produced by reacting upon a dihalogenhydrin of glycerol with ammonia, while maintaining the temperature of the reacting mixture too low to form water-insoluble organic bodies or organic bodies not containing halogen linked to carbon.

26. Aliphatic organic substances which contain halogen linked to carbon, nitrogen linked to carbon and oxygen linked to carbon, not more than two of said three substituents being linked to the same carbon atom, and which organic substances are soluble in water, and which substances are substantially identical with the products of the process of claim 1.

27. Aliphatic organic substances which contain halogen linked to carbon, nitrogen linked to carbon and oxygen linked to carbon, all three of said substituents being linked to different carbon atoms, and which organic substances are soluble in water, and which substances are substantially identical with the products of the process of claim 1.

28. Aliphatic organic substances which contain unsaturated products, as is shown by directly adding iodine, and which contain halogen linked to carbon, nitrogen linked to carbon and oxygen linked to carbon, not more than two of said three substituents being linked to the same carbon atom, and which organic substances are soluble in water, and which substances are substantially identical with the products of the process of claim 1.

29. The herein described product consisting of the liquid viscous reaction product of ammonia upon a dihalogenhydrin of glycerol, which product is soluble in water, said product containing halogen linked to carbon in an aliphatic chain and containing nitrogen linked to carbon and containing hydroxyl linked to carbon in said chain, said product having an elementary analysis which corresponds fairly with the formula $C_6H_{13}O_2NHa_2$, in which Ha represents a halogen element.

LEON LILIENFELD.